(12) United States Patent
Tanaka

(10) Patent No.: US 9,025,212 B2
(45) Date of Patent: *May 5, 2015

(54) SCANNER DEVICE AND IMAGE FORMING APPARATUS HAVING THE SAME

(71) Applicant: KYOCERA Document Solutions Inc., Osaka-shi, Osaka (JP)

(72) Inventor: Koichi Tanaka, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,637

(22) Filed: Nov. 20, 2013

(65) Prior Publication Data

US 2014/0160537 A1 Jun. 12, 2014

(30) Foreign Application Priority Data

Dec. 12, 2012 (JP) ................................. 2012-271759

(51) Int. Cl.
 *H04N 1/04* (2006.01)
 *H04N 1/333* (2006.01)
 *H04N 1/00* (2006.01)
 *H04N 1/40* (2006.01)

(52) U.S. Cl.
 CPC ........... *H04N 1/333* (2013.01); *H04N 1/00806* (2013.01); *H04N 1/00822* (2013.01); *H04N 1/00827* (2013.01); *H04N 1/40056* (2013.01)

(58) Field of Classification Search
 CPC ............ G06K 7/14; H04N 2201/0081; H04N 1/12;H04N 5/343; H04N 1/00572; H04N 1/00795; H04N 1/00806; H04N 1/00822; H04N 1/32673; G02B 26/005; G02B 26/10; G02B 3/14
 USPC ............... 358/498, 474, 1.13, 488, 497, 1.15, 358/486, 509, 512
 See application file for complete search history.

(56) References Cited

U.S. PATENT DOCUMENTS

| | | | | |
|---|---|---|---|---|
| 5,065,434 | A * | 11/1991 | Matsuoka et al. | 382/114 |
| 5,298,717 | A * | 3/1994 | DeRossett, Jr. | 219/121.68 |
| 6,359,705 | B2 * | 3/2002 | Funakoshi et al. | 358/475 |
| 6,970,400 | B1 * | 11/2005 | Wakabayashi et al. | 369/13.2 |
| 7,357,325 | B2 * | 4/2008 | Zhu et al. | 235/462.22 |
| 7,444,028 | B2 * | 10/2008 | Takahashi | 382/237 |
| 7,843,578 | B2 * | 11/2010 | Nonaka et al. | 358/1.13 |
| 8,493,576 | B2 * | 7/2013 | Enomoto | 358/1.13 |
| 8,941,894 | B2 * | 1/2015 | Tanaka | 358/474 |
| 2006/0255149 | A1 * | 11/2006 | Retter et al. | 235/462.41 |

FOREIGN PATENT DOCUMENTS

JP 07143340 A 6/1995

* cited by examiner

*Primary Examiner* — Negussie Worku
(74) *Attorney, Agent, or Firm* — Alleman Hall McCoy Russell & Tuttle LLP

(57) ABSTRACT

A scanner device according to one aspect of the present disclosure has a first mode for reading a normal object placed on a document table, and a second mode for reading a self-luminous object placed on the document table. The scanner device has a light detecting portion and a control portion. The light detecting portion detects light of an object placed on the document table. The control portion switches the reading mode between the first mode and the second mode on the basis of a detection result of the light detecting portion.

20 Claims, 6 Drawing Sheets

Fig. 8A
Fig. 8B
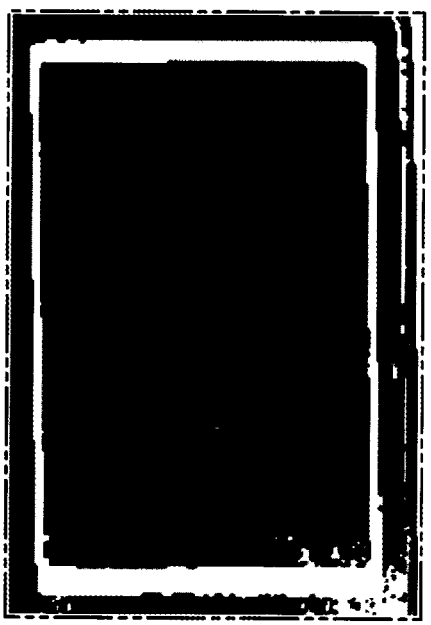

SCANNER DEVICE AND IMAGE FORMING APPARATUS HAVING THE SAME

INCORPORATION BY REFERENCE

This application is based upon and claims the benefit of priority from the corresponding Japanese Patent Application No. 2012-271759 filed on Dec. 12, 2012, the entire contents of which are incorporated herein by reference.

BACKGROUND

The present disclosure relates to a scanner device and an image forming apparatus.

In association with recent development in informational technology, cellular phones, touch-panel-type tablet devices, and other terminal devices have become widely used by general users. These terminal devices have a display portion such as a liquid crystal screen for displaying images. A user can acquire desired information from images displayed on the display portion.

When one user intends to let other user view the information, the user typically sends the image data to a terminal device of the other user. However, the other user does not always carry a terminal device, or communication environment is not always established in the periphery. In such a case, it is conceivable to directly read the image displayed on the terminal device by a scanner device, and hand out a copy of the read image printed by a copying machine or the like. Such a situation is expected to further increase with the prevalence of terminal devices.

Conventionally, an image processing apparatus having a color image scanner that reads a color document is known. The image processing apparatus has two reading modes enabling a reading process of normally reading a document and a reading process of directly reading a display screen of a color display, for effecting color compensation of color display. For normally reading a document, a light source for illuminating document is turned on. On the other hand, for directly reading a display screen of a display, the light source for illuminating document is turned off because the display itself emits light.

In the above conventional art, switching of the reading mode is manually conducted by a user, and the reading mode needs to be switched manually in each time. This switching operation is troublesome and inconvenient. For correction of this, it is conceivable to use the technique of providing the display with a coordinate position input device, and switch the reading mode automatically upon detection of attachment of the display to the color image scanner. However, it is impractical to provide the aforementioned coordinate position input device for the display of each of terminal devices possessed by users.

SUMMARY

A scanner device according to one aspect of the present disclosure has a first mode for reading a normal object placed on a document table, and a second mode for reading a self-luminous object placed on the document table. The scanner device includes a light detecting portion and a control portion. The light detecting portion detects light of an object placed on the document table. The control portion switches the reading mode between the first mode and the second mode on the basis of a detection result of the light detecting portion.

An image forming apparatus according to another aspect of the present disclosure includes a scanner device having a first mode for reading a normal object placed on a document table, and a second mode for reading a self-luminous object placed on the document table. The scanner device has a light detecting portion and a control portion. The light detecting portion detects light of an object placed on the document table. The control portion switches the reading mode between the first mode and the second mode on the basis of a detection result of the light detecting portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8A is an image of a liquid crystal screen of a terminal device read in the normal document scan mode in the embodiment of the preset disclosure, and FIG. 8B is a view of an image of the liquid crystal screen of the terminal device read in the display screen scan mode.

DETAILED DESCRIPTION

Figure 1:
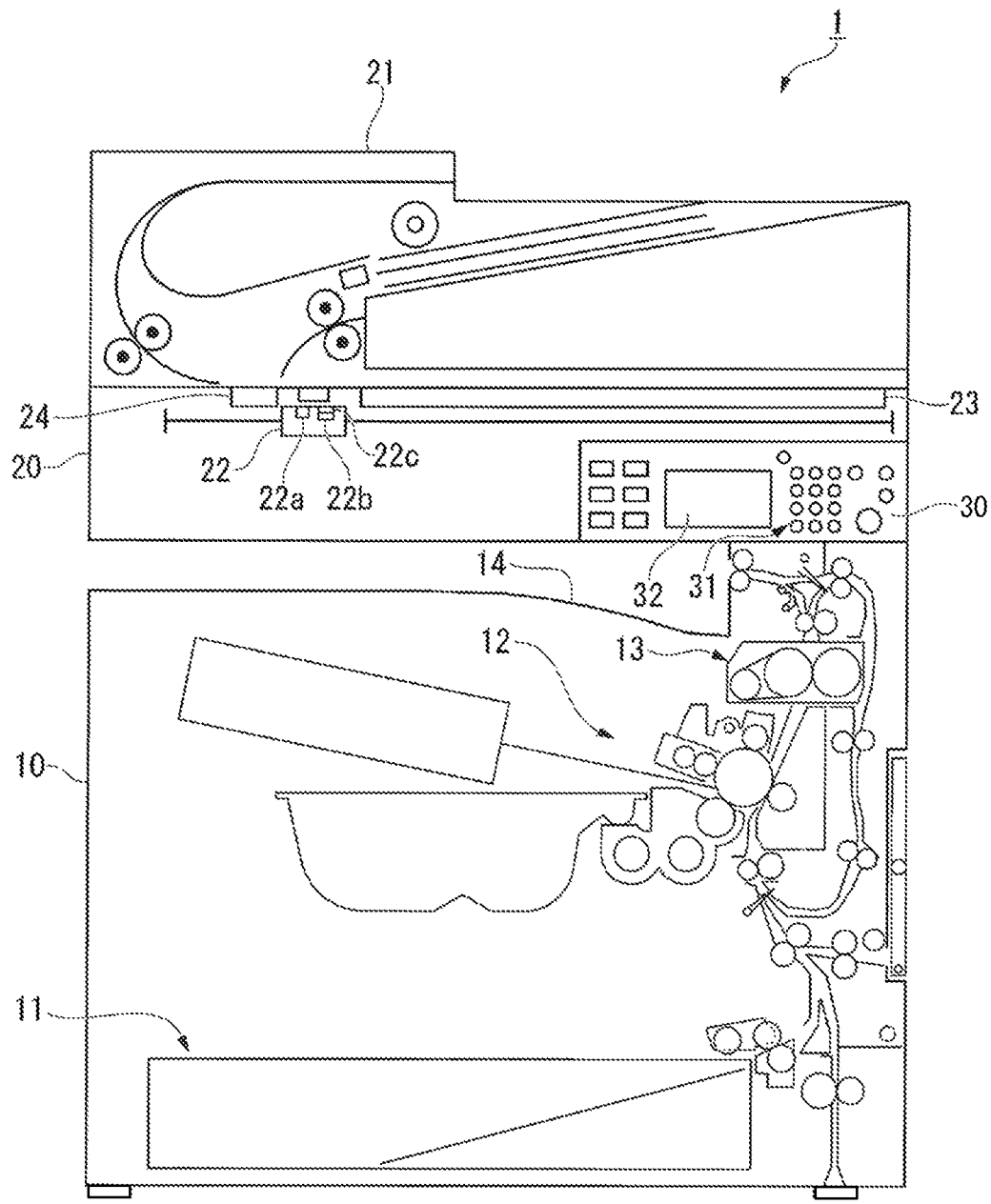
FIG. 1 is a front perspective view showing configuration of major parts of a multifunction peripheral in the embodiment of the present disclosure.
Figure 2:
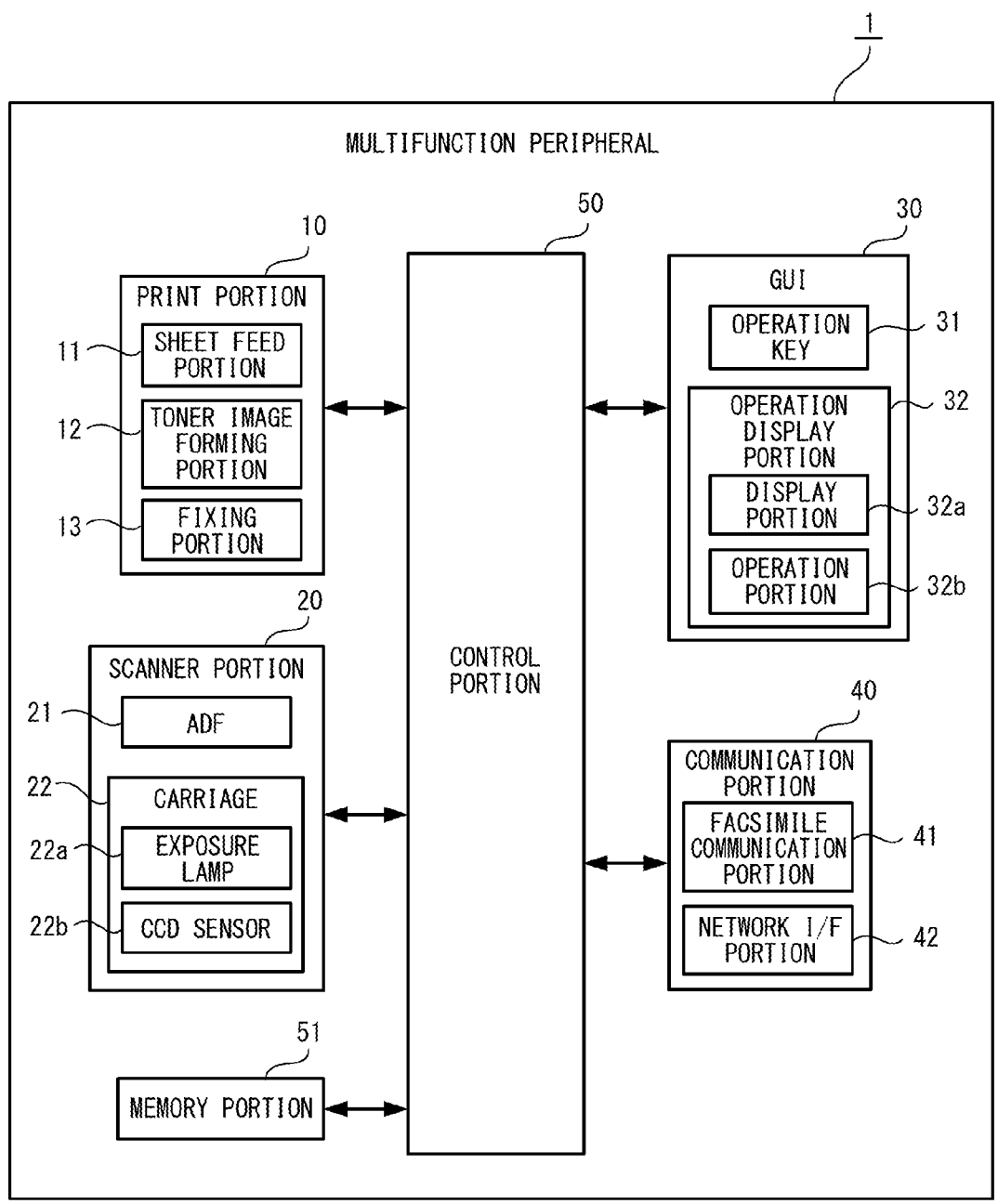
FIG. 2 is a functional block diagram of the multifunction peripheral in the embodiment of the present disclosure.

Hereinafter, one embodiment of the present disclosure will be described in detail based on the drawings. In the following, description will be given by exemplifying a multifunction peripheral having functions including a copying machine, a printer, and a facsimile, as an image forming apparatus having a scanner device according to the present disclosure. FIG. 1 is a front perspective view showing configuration of major parts of a multifunction peripheral 1 in the embodiment of the present disclosure. FIG. 2 is a functional block diagram of the multifunction peripheral 1 in the embodiment of the present disclosure. As shown in FIG. 1 and FIG. 2, the multifunction peripheral 1 includes a print portion 10, a scanner portion (scanner device) 20, a GUI (Graphical User Interface) 30, a communication portion 40, a control portion 50 and a memory portion 51.

The scanner portion 20 reads a document or the like (object) placed by a user under the control by the control portion 50, and generates document image data showing an image of the document and outputs the data to the control portion 50. The scanner portion 20 includes an ADF (Automatic Document Feeder) 21, a carriage 22, a document table 23 and a document reading slit 24. The carriage 22 carries an exposure lamp (light source) 22a, a CCD (Charge Coupled Device) sensor (light detecting portion) 22b and so on, and reads documents sequentially fed by the ADF 21 or a document or the like placed on the document table 23.

Concretely, in reading a document placed on the document table 23, the carriage 22 reads the document by the CCD sensor 22b while moving longitudinally of the document table 23. On the other hand, in reading documents fed from the ADF 21, the carriage 22, situated at the position opposed to the document reading slit 24 (the position below the document reading slit 24), reads the documents sequentially fed from the ADF 21 by the CCD sensor 22b through the document reading slit 24.

The CCD sensor 22b of the present embodiment has an optical filter 22c that makes external incident light entering the document table 23 undetected. The optical filter 22c of the present embodiment is formed, for example, of a band-pass filter, and blocks transmission of wavelengths of external incident light components of the light entering the CCD sensor 22, to thereby exclude disturbance. Concretely, the optical filter 22c is designed to cut wavelengths of fluorescent lamp components (peaks at 490 nm, 540 nm, 610 nm in the case of a three band fluorescent lamp, for example). As a result, the CCD sensor 22b can detect any light from a display screen of a terminal device (peaks at 470 nm and 580 nm in the case of white LED (Light Emitting Diode) of liquid crystal backlight) without influence of disturbance.

The GUI 30 outputs a signal corresponding to an operation made by a user (operation signal) to the control portion 50, while displaying various information such as information showing the state of the multifunction peripheral 1 in accordance with the control by the control portion 50, and includes an operation key 31 and an operation display portion 32. The operation key 31 includes hard keys such as a copy start key, a copy stop/clear key, ten keys (numeric input keys) and a function switching key. The function switching key is provided for a user to switch the operation mode of the multifunction peripheral 1 to intended one of the copying function, the printing function, the scanning function and the facsimile function realized by the multifunction peripheral 1.

The operation display portion 32 includes a display portion 32a that displays a predetermined image under the control of the control portion 50, and an operation portion 32b that outputs an operation signal corresponding to an operation made on the display screen of the display portion 32a to the control portion 50. The display portion 32a is, for example, a liquid crystal panel or an organic EL panel. The operation portion 32b is, for example, a touch panel disposed oppositely to the display screen of the display portion 32a, and outputs a signal indicating the coordinates of a portion pressed down by the user, as the aforementioned operation signal.

The communication portion 40 communicates with a facsimile device at other end, or an external device such as a personal computer, and includes a facsimile communication portion 41 and a network I/P portion 42.

The control portion 50 integrally controls the overall operation of the multifunction peripheral 1 on the basis of an operation signal inputted from the GUI 30 and a signal received from an external device via the communication portion 40. The control portion 50 is composed of an internal memory, a CPU (Central Processing Unit), and various I/O interface lines for sending/receiving data to/from other portions.

The control portion 50 is able to switch the reading mode of the scanner portion 20 between a normal document scan mode (first mode) for reading a normal object (e.g., document) placed on the document table 23, and a display screen scan mode (second mode) for reading a display screen (e.g., liquid crystal screen, organic EL screen) of a self-luminous object (e.g., cellular phone, smartphone, tablet device) placed on the document table 23. Table 1 shows examples of initial settings for the reading condition in the normal document scan mode and the reading condition in the display screen scan mode.

TABLE 1

|  | Initial settings for normal document scan mode | Initial settings for display screen scan mode |
| --- | --- | --- |
| Original size | Standard size of sheet such as A4, A3 Select standardized size of sheet by auto size detection | Cellular phone size/Smartphone size/Tablet size |
| Exposure | Normal (4th of 7 levels/ Auto exposure) | Brighter than normal (brighter than 1st of 7 levels) |
| Resolution | 300 DPI | 600 DPI |

As shown in Table 1, in the display screen scan mode, the size of an original to be read is preset for each type of terminal devices (cellular phone, smartphone, tablet device) rather than the standardized sizes defined by a standard as in the normal document scan mode. In the display screen scan mode, the illumination condition of the exposure lamp 22a is set to be brighter than that in the normal document scan mode. Also, in the display screen scan mode, reading resolution (DPI (Dots Per Inch)) condition of the CCD sensor 22b is set to be higher than that in the normal document scan mode.

The memory portion 51 stores a plurality of reading donditions in the display screen scan mode. The plural reading conditions are set, for example, for each type of terminal devices (cellular phone, smartphone, tablet device). As will be described in detail later, the control portion 50 of the present embodiment automatically switches the reading mode of the scanner portion 20 to the normal document scan mode or the display screen scan mode on the basis of a light detection result by the CCD sensor 22b.

Figure 3:
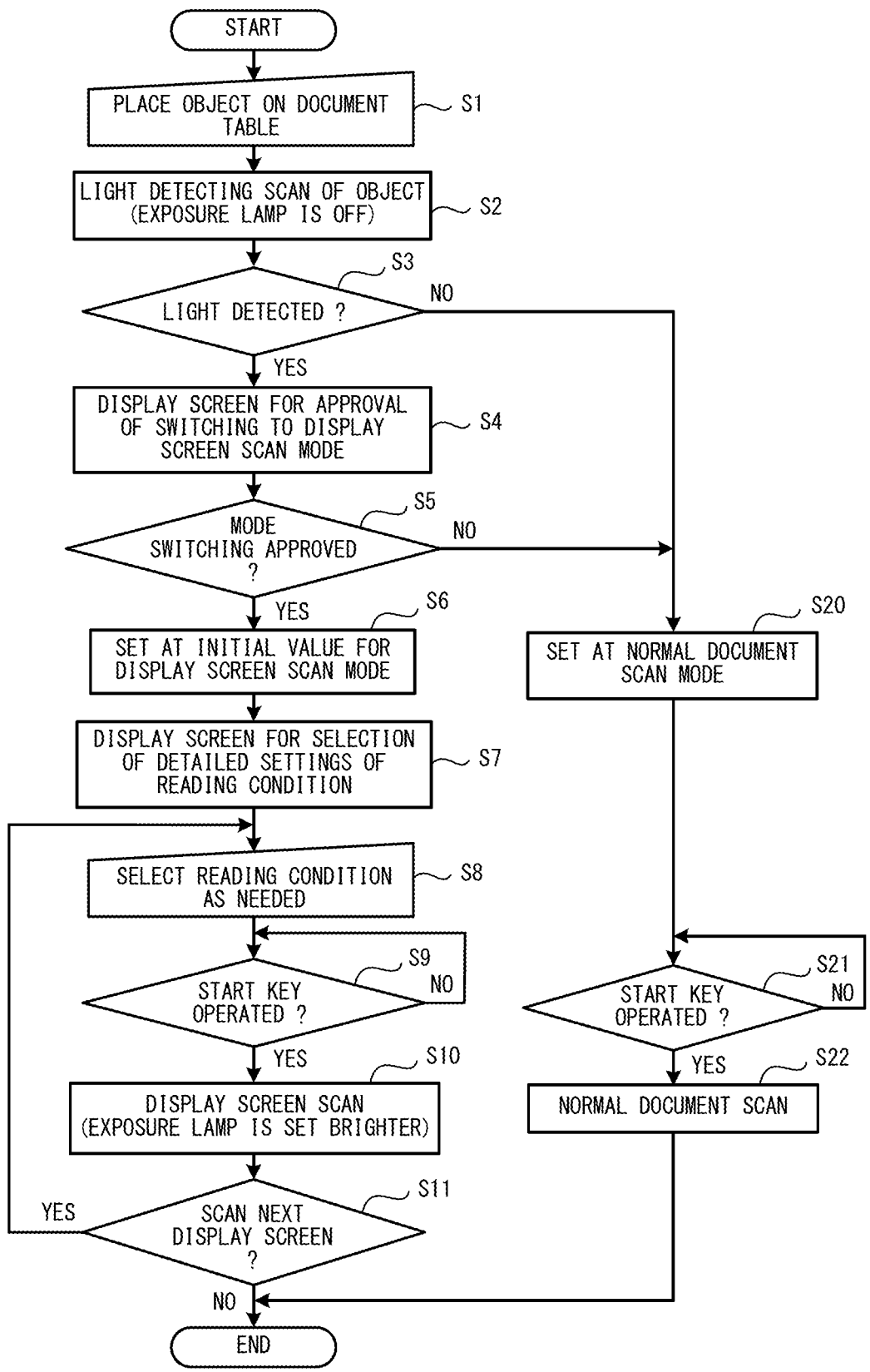
FIG. 3 is a flowchart showing operation of the multifunction peripheral in the embodiment of the present disclosure (particularly, a sequence of various processes in the scanner portion).

Next, operation of the multifunction peripheral 1 configured as described above will be described. FIG. 3 is a flowchart showing operation of the multifunction peripheral 1 in the embodiment of the present disclosure (a sequence of various processes particularly in the scanner portion 20). For reading a certain object with the scanner portion 20, a user first places the object on the document table 23 (step S1).

Figure 4:
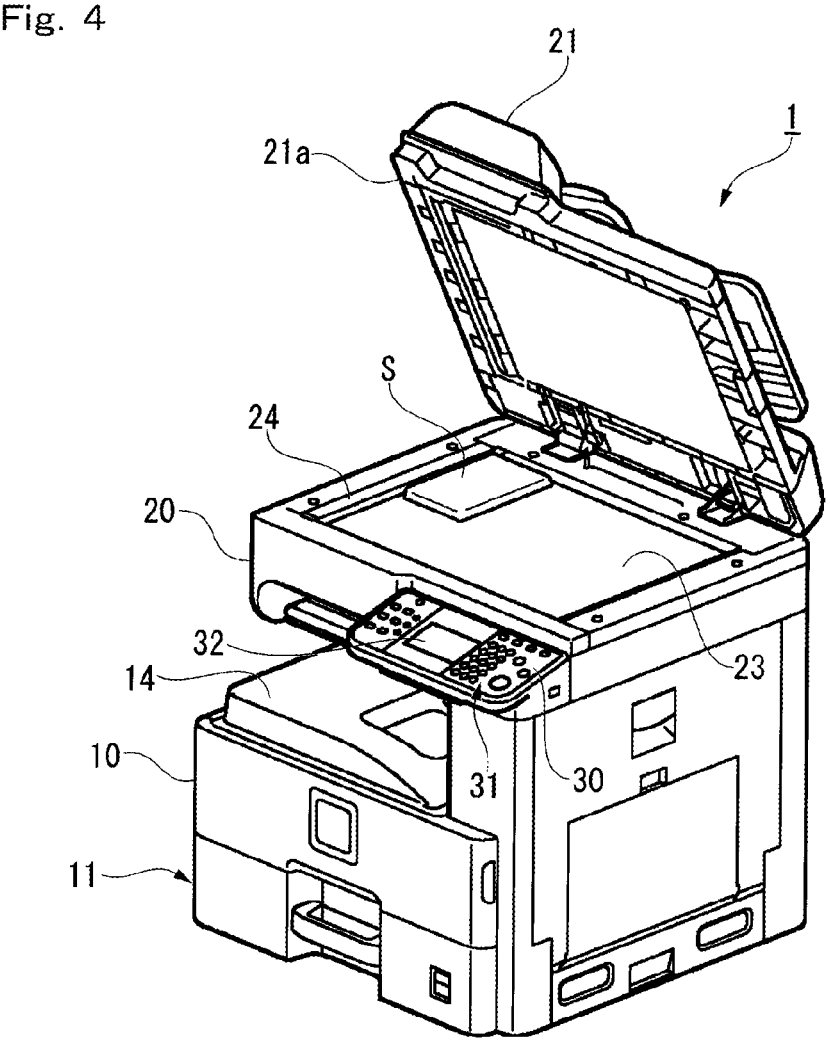
FIG. 4 is a view showing the state that a terminal device is placed as an object to be read on the document table in the embodiment of the present disclosure.

FIG. 4 is a view showing the state that a terminal device S is placed as an object to be read on the document table 23 in the embodiment of the present disclosure. As shown in FIG. 4, a user opens a document holding cover 21a that is integrally formed with the ADF 21, and places the object (terminal device S) with its corner aligned with the back corner of the document table 23 in the same manner for a normal document. When the object is a thick article like the terminal device S, the document holding cover 21a is partly open, and ambient light will enter the document table 23.

Next, the control portion 50 causes execution of a light detecting scan for detecting light from the object placed on the document table 23 (step S2). The light detecting scan is executed by being triggered, for example, by an operation of a start key of the operation key 31 made by the user. In the light detecting scan, presence or absence of light from the object placed on the document table 23 is detected by the CCD sensor 22b while the carriage 22 moves longitudinally of the document table 23.

The control portion 50 causes execution of the light detecting scan for determining whether or not the object placed on the document table 23 itself emits light. The light detecting scan is different from a normal document scan. The exposure lamp 22a that illuminates an object can interfere with the light detection. For this reason, the control portion 50 turns off the exposure lamp 22a during the light detecting scan by the CCD sensor 22b. This enables the CCD sensor 22b to detect faint light (like backlight of a liquid crystal screen), and the light detecting accuracy in step S2 can be improved.

In the present embodiment, the CCD sensor 22b has the optical filter 22c for making the external incident light entering the document table 23 undetected. As shown in FIG. 4, when the object is the terminal device S having thickness, the document holding cover 21a sometimes cannot be closed. In such a case, transmission of the external incident light entering the document table 23 (for example, wavelengths of fluorescent lamp components) is blocked by the optical filter 22c. As a result, the CCD sensor 22b becomes able to detect only the light from the object placed on the document table 23 and the light detecting accuracy in step S2 can be further improved.

Next, the control portion 50 determines whether or not the CCD sensor 22b detects light from the object as a result of the light detecting scan (step S3). When the determination in step S3 is "YES", namely the object placed on the document table 23 is a self-luminous object such as the terminal device S, the flow proceeds to step S4. On the other hand, when the determination in step S3 is "NO", namely the object placed on the document table 23 is not a self-luminous object like the terminal device S but a normal document, the flow proceeds to step S20.

When the flow proceeds to step S20, the control portion 50 switches the reading mode of the scanner portion 20 to the aforementioned normal document scan mode. Then the control portion 50 executes a normal document scan (the exposure lamp 22a is ON) (S22) in response to an operation made on the start key by the user (step S21), and the scan sequence ends. On the other hand, when the flow proceeds to step S4, the control portion 50 controls the display portion 32a to display a screen for approval of switching to display screen scan mode, prior to switching the reading mode of the scanner portion 20 to the aforementioned display screen scan mode.

Figure 5:
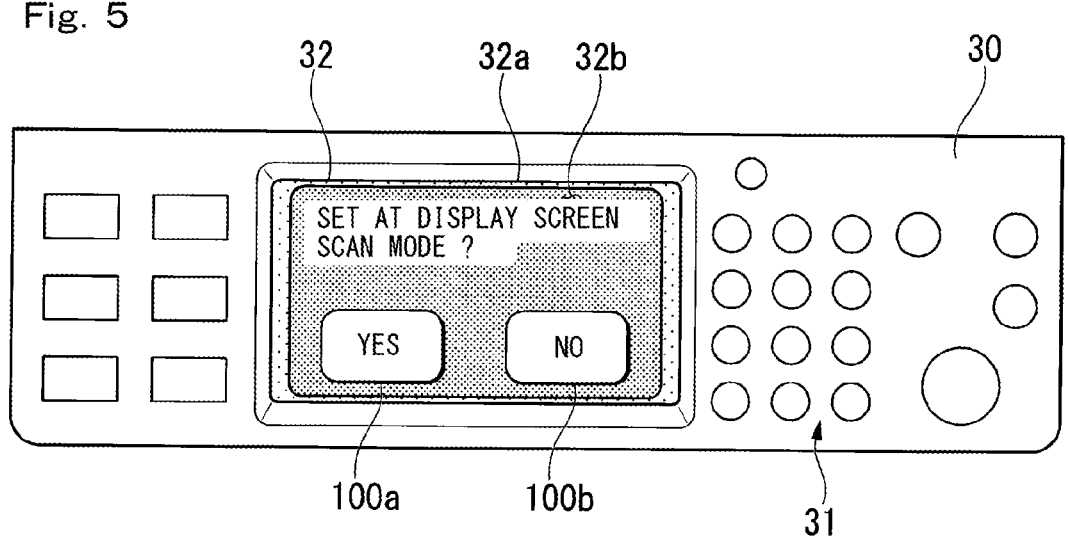
FIG. 5 is a view showing a screen for approval of switching to display screen scan mode in the embodiment of the present disclosure.

FIG. 5 is a view showing a screen for approval of switching to display screen scan mode in the embodiment of the present disclosure. As shown in FIG. 5, the control portion 50 controls the display portion 32a to display an approval button 100a and a disapproval button 100b for switching to display screen scan mode. The control portion 50 determines which one of the approval button 100a indicating "YES" and the disapproval button 100b indicating "NO" is pressed down (step S5). Step S5 asks the user for prior confirmation before switching of the reading mode of the scanner portion 20.

When the determination in step S5 is "YES", namely the object placed on the document table 23 is a self-luminous object like the terminal device S, and the approval button 100a is pressed down, the flow proceeds to step S6. On the other hand, when the determination in step S5 is "NO", namely the disapproval button 100b is pressed down because the object placed on the document table 23 is actually a normal document, and the present mode switching is due to erroneous detection in the light detecting scan and is not intended by the user, the flow proceeds to step S20.

When the flow proceeds to step S20, the control portion 50 switches the reading mode of the scanner portion 20 to the aforementioned normal document scan mode. Then the control portion 50 executes a normal document scan (the exposure lamp 22a is ON) (S22) in response to an operation made on the start key by the user (step S21), and the scan sequence ends. On the other hand, when the flow proceeds to step S6, the control portion 50 switches the reading mode of the scanner portion 20 to the aforementioned display screen scan mode (initial value). Then the control portion 50 controls the display portion 32a to display a screen for selection of detailed settings of reading condition in the display screen scan mode (step S7).

Figure 6:
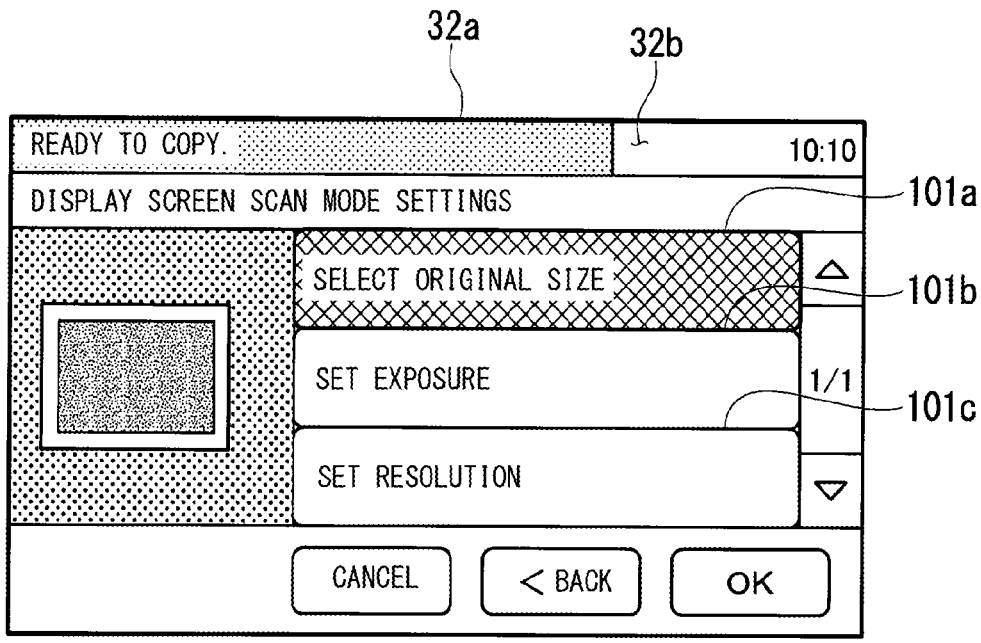
FIG. 6 is a view showing a screen for selecting settings of reading conditions in a display screen scan mode in the embodiment of the present disclosure.

FIG. 6 is a view showing a screen for selection of settings of reading condition in the display screen scan mode in the embodiment of the present disclosure. As shown in FIG. 6, the control portion 50 controls the display portion 32a to display buttons 101a to 101c for individually changing the reading conditions in the display screen scan mode set as the initial values. In the present embodiment, the button 101a is assigned to "SELECT ORIGINAL SIZE", the button 101b is assigned to "SET EXPOSURE", and the button 101c is assigned to "SET RESOLUTION". The user operates the buttons 101a to 101c as needed, to select the reading condition (step S8).

Figure 7:
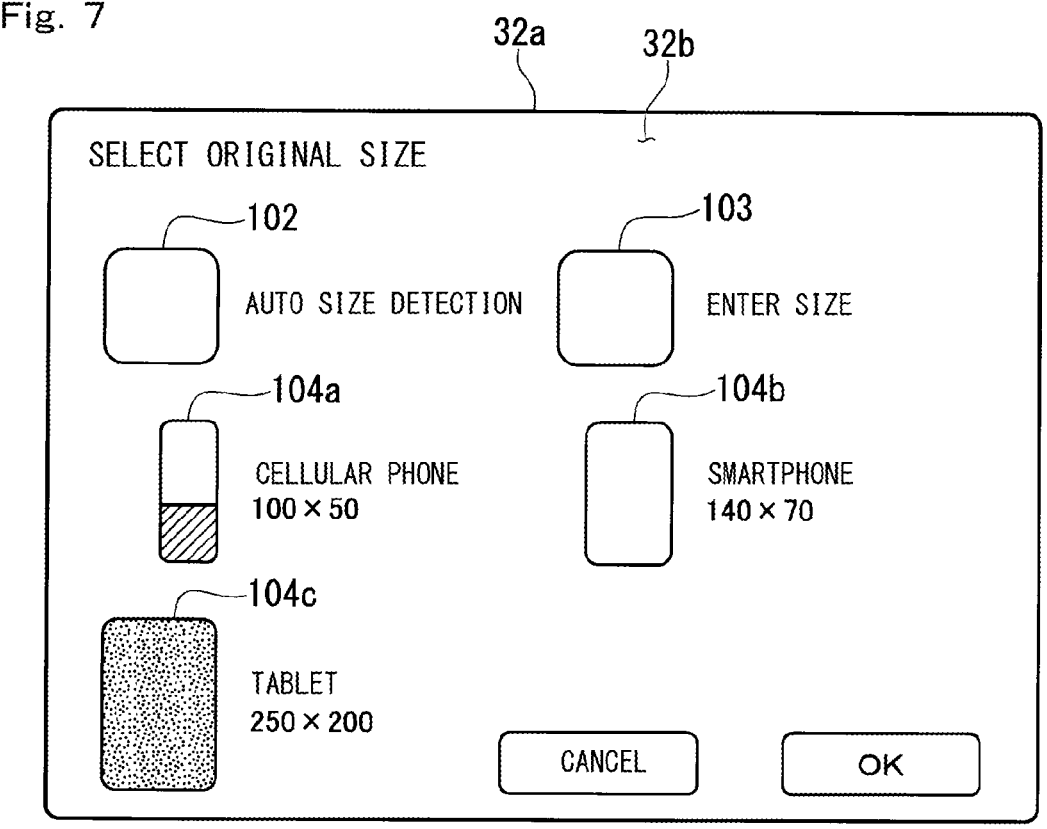
FIG. 7 is a view showing a screen for selecting original size of reading conditions in the display screen scan mode in the embodiment of the present disclosure.

FIG. 7 is a view showing a screen for selection of original size of the reading condition in the display screen scan mode in the embodiment of the present disclosure. As shown in FIG. 7, the control portion 50 controls the display portion 32a to display a button 102 for "AUTO SIZE DETECTION", a button 103 for "ENTER SIZE", and a button 104a for "CELLULAR PHONE", a button 104b for "SMARTPHONE", and a button 104c for "TABLET" that are the reading conditions (original size) preliminarily stored in the memory portion 51, when the button 101a for "SELECT ORIGINAL SIZE" is pressed down.

The button 102 for "AUTO SIZE DETECTION" is provided for instructing the control portion 50 to execute the process for detecting the original size of a self-luminous object like the terminal device S in the same manner as automatic size detection for a normal document. The button 103 for "ENTER SIZE" is provided for a user to manually enter the size of the original, for example, when the terminal device S is a new product or a non-standardized product. The buttons 104a to 104c are provided for a user to press down a corresponding button when the self-luminous object placed on the document table 23 is any one of "CELLULAR PHONE", "SMARTPHONE" and "TABLET DEVICE". By pressing down any one of the buttons, a user can easily set the reading condition corresponding to the button from the preliminarily stored reading conditions.

In the present embodiment, when the user selects and presses down any one of the buttons 104a to 104c for "CELLULAR PHONE", "SMARTPHONE" and "TABLET DEVICE", appropriate values that are determined experimentally and previously stored are set in "SET EXPOSURE" and "SET RESOLUTION" together with the corresponding appropriate "ORIGINAL SIZE". As a result, the user can set the optimum reading condition and enabling reading of the display screen of the object only by selecting the type of the object to be read (cellular phone, smartphone or tablet device in the present embodiment). When the user intends to change the settings individually, the user can go back to the screen shown in FIG. 6 and "SET EXPOSURE" or "SET RESOLUTION".

Next, the control portion 50 causes execution of a display screen scan (step S10) in response to an operation of the start key made by the user (step S9). In the present embodiment, the exposure lamp 22a that illuminates an object placed on the document table 23 is provided, and as shown in Table 1, the exposure lamp 22a in the display screen scan mode is set to be brighter than that in the normal document scan mode. This is because as shown in FIG. 8, more light from the exposure lamp 22a is required for appropriately scanning the display screen of the terminal device S than for scanning a normal document.

FIG. 8A is an image of a liquid crystal screen of the terminal device S read in the normal document scan mode in the embodiment of the present disclosure. FIG. 8B is a view showing an image of the liquid crystal screen of the terminal device S read in the display screen scan mode. As can be seen from FIG. 8A, when the liquid crystal screen is read in the normal document scan mode, the image is really dark, and the screen cannot be distinguished. On the other hand, as can be seen from FIG. 8B, when the exposure lamp 22a is set to be "brighter" by switching to the display screen scan mode (see Table 1), the screen can be distinguished.

As described above, it is experimentally recognized that in conducting reading in the display screen scan mode, the display screen can be read appropriately by setting the exposure lamp 22a to be brighter than that in the normal document scan mode. For scanning the next display screen, the flow returns to step S8 to allow selection of the reading condition as needed (step S11). On the other hand, when scanning of the next display screen will not be conducted, the scan sequence in the display screen scan mode ends.

As described above, according to the embodiment described above, when the CCD sensor 22b detects light from the object placed on the document table 23, the control portion 50 determines that the object is a self-luminous terminal device S, and automatically switches the reading mode from the normal document scan mode that is normally set, to the display screen scan mode dedicated for a self-luminous object. Therefore, the user can cause the display screen of the terminal device S to be read by a simple operation without necessity of complicated operation. Therefore, it is possible to obtain the scanner portion 20 and the multifunction peripheral 1 capable of reading the display screen of the terminal device S with simple operation.

The preferred embodiment of the present disclosure has been described by referring to the drawings, however, the present disclosure is not limited to the above embodiment. The forms, combinations and the like of the constituents shown in the above embodiment are merely examples, and various modifications may be made according to particular design requests and the like without departing from the scope of the subject matter of the present disclosure.

For example, the above embodiment has described the form where the CCD sensor for reading a document is used also as the light detecting portion, however, the present disclosure is not limited to this, and a dedicated light detecting sensor may be provided separately as the light detecting portion.

For example, in the above embodiment, "ORIGINAL SIZE", "EXPOSURE" and "RESOLUTION" are exemplified as examples of initial settings of the reading condition in the normal document scan mode and for the reading condition in the display screen scan mode as shown in Table 1, however, the present disclosure is not limited to this. In the case where the multifunction peripheral 1 is adapted for color copying, "COLOR MODE" may be made settable. For example, "monochrome" may be set in the normal document scan mode, and "COLOR" or "GRAY SCALE" may be made selectable in the display screen scan mode.

For example, the above embodiment has described that the user is allowed to select the reading condition as needed in scanning the next screen (step S11→step S8). In such a case, the read image may be previewed on the screen as shown, for example, in FIG. 6 together with an image adjustment button to allow the user to adjust the image as appropriate.

For example, the above embodiment has described the image forming apparatus according to the present disclosure by referring to the multifunction peripheral, however, the present disclosure may be applied to other image forming apparatuses such as a copying machine, without limited to this. The present disclosure may also be applied to a single scanner device separated from the image forming apparatus. In this case, the constituents such as the control portion are provided in the scanner device.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A scanner device having a first mode that is a reading mode for reading, by scanning, a normal object placed on a document table, and a second mode that is another reading mode for reading, by scanning, a self-luminous object placed on the document table, the scanner device comprising:
a light detecting portion that detects light of an object placed on the document table, and
a control portion that switches the reading mode between the first mode and the second mode on the basis of a detection result of the light detecting portion.

2. The scanner device according to claim 1, further comprising:
a light source that illuminates an object placed on the document table,
wherein the control portion turns off the light source when the light detecting portion conducts detection.

3. The scanner device according to claim 2,
wherein the light detecting portion has an optical filter for making external incident light entering the document table undetected.

4. The scanner device according to claim 3, further comprising:
a display portion that displays a predetermined image;
an operation portion that outputs an operation signal corresponding to an operation made on a display screen of the display portion; and
a memory portion preliminarily storing a plurality of reading conditions in the second mode,
wherein the control portion displays buttons for allowing selection of the plural reading conditions on the display screen in the second mode, and upon detection of an operation signal of a button, sets a reading condition corresponding to the button and causes reading of the object.

5. The scanner device according to claim 4, further comprising:
a light source that illuminates an object placed on the document table,
wherein the light source is set to be brighter in the second mode than in the first mode of the scanner device.

6. The scanner device according to claim 3, further comprising:
a light source that illuminates an object placed on the document table, wherein the light source is set to be brighter in the second mode than in the first mode of the scanner device.

7. The scanner device according to claim 2, further comprising:
a display portion that displays a predetermined image;
an operation portion that outputs an operation signal corresponding to an operation made on a display screen of the display portion; and
a memory portion preliminarily storing a plurality of reading conditions in the second mode,
wherein the control portion displays buttons for allowing selection of the plural reading conditions on the display screen in the second mode, and upon detection of an operation signal of a button, sets a reading condition corresponding to the button and causes reading of the object.

8. The scanner device according to claim 2, further comprising:
a light source that illuminates an object placed on the document table,
wherein the light source is set to be brighter in the second mode than in the first mode of the scanner device.

9. The scanner device according to claim 1, further comprising:
a display portion that displays a predetermined image;
an operation portion that outputs an operation signal corresponding to an operation made on a display screen of the display portion; and
a memory portion preliminarily storing a plurality of reading conditions in the second mode,
wherein the control portion displays buttons for allowing selection of the plural reading conditions on the display screen in the second mode, and upon detection of an operation signal of a button, sets a reading condition corresponding to the button and causes reading of the object.

10. The scanner device according to claim 1, further comprising:
a light source that illuminates an object placed on the document table,
wherein the light source is set to be brighter in the second mode than in the first mode of the scanner device.

11. An image forming apparatus comprising a scanner device having a first mode that is a reading mode for reading, by scanning, a normal object placed on a document table, and a second mode that is another reading mode for reading, by scanning, a self-luminous object placed on the document table, the scanner device including:
a light detecting portion that detects light of an object placed on the document table; and
a control portion that switches the reading mode between the first mode and the second mode on the basis of a detection result of the light detecting portion.

12. The image forming apparatus according to claim 11, wherein
the scanner device includes a light source that illuminates an object placed on the document table, and
the control portion turns off the light source when the light detecting portion conducts detection.

13. The image forming apparatus according to claim 12, wherein the light detecting portion has an optical filter for making external incident light entering the document table undetected.

14. The image forming apparatus according to claim 13, wherein
the scanner device further includes:
a display portion that displays a predetermined image;
an operation portion that outputs an operation signal corresponding to an operation made on a display screen of the display portion; and
a memory portion preliminarily storing a plurality of reading conditions in the second mode, and
the control portion displays buttons for allowing selection of the plural reading conditions on the display screen in the second mode, and upon detection of an operation signal of a button, sets a reading condition corresponding to the button and causes reading of the object.

15. The image forming apparatus according to claim 14, wherein
the scanner device further includes a light source that illuminates an object placed on the document table, and
the light source is set to be brighter in the second mode than in the first mode of the scanner device.

16. The image forming apparatus according to claim 13, wherein
the scanner device further includes a light source that illuminates an object placed on the document table, and
the light source is set to be brighter in the second mode than in the first mode of the scanner device.

17. The image forming apparatus according to claim 12, wherein
the scanner device further includes:
a display portion that displays a predetermined image;
an operation portion that outputs an operation signal corresponding to an operation made on a display screen of the display portion; and
a memory portion preliminarily storing a plurality of reading conditions in the second mode, and
the control portion displays buttons for allowing selection of the plural reading conditions on the display screen in the second mode, and upon detection of an operation signal of a button, sets a reading condition corresponding to the button and causes reading of the object.

18. The image forming apparatus according to claim 12, wherein
the scanner device further includes a light source that illuminates an object placed on the document table, and
the light source is set to be brighter in the second mode than in the first mode of the scanner device.

19. The image forming apparatus according to claim 11, wherein
the scanner device further includes:
a display portion that displays a predetermined image;
an operation portion that outputs an operation signal corresponding to an operation made on a display screen of the display portion; and
a memory portion preliminarily storing a plurality of reading conditions in the second mode, and
the control portion displays buttons for allowing selection of the plural reading conditions on the display screen in the second mode, and upon detection of an operation signal of a button, sets a reading condition corresponding to the button and causes reading of the object.

20. The image forming apparatus according to claim 11, wherein
the scanner device further includes a light source that illuminates an object placed on the document table, and
the light source is set to be brighter in the second mode than in the first mode of the scanner device.

* * * * *